US010191214B2

(12) United States Patent
Dong

(10) Patent No.: US 10,191,214 B2
(45) Date of Patent: Jan. 29, 2019

(54) PHOTONIC INTEGRATED CIRCUIT HAVING A RELATIVE POLARIZATION-ROTATING SPLITTER/COMBINER

(71) Applicant: Alcatel-Lucent USA Inc., Murray Hill, NJ (US)

(72) Inventor: Po Dong, Morganville, NJ (US)

(73) Assignee: NOKIA OF AMERICA CORPORATION, Murray Hill, NJ (US)

(*) Notice: Subject to any disclaimer, the term of this patent is extended or adjusted under 35 U.S.C. 154(b) by 0 days.

(21) Appl. No.: 15/475,805

(22) Filed: Mar. 31, 2017

(65) Prior Publication Data
US 2018/0284347 A1    Oct. 4, 2018

(51) Int. Cl.
G02B 6/00    (2006.01)
G02B 6/126   (2006.01)
G02B 6/122   (2006.01)
G02B 6/27    (2006.01)

(52) U.S. Cl.
CPC ........... *G02B 6/126* (2013.01); *G02B 6/1228* (2013.01); *G02B 6/2726* (2013.01); *G02B 6/2773* (2013.01)

(58) Field of Classification Search
USPC .......................................................... 385/11
See application file for complete search history.

(56) References Cited

U.S. PATENT DOCUMENTS 5,949,943 A * 9/1999 Watanabe .............. G02B 6/124
                                                    385/11
7,680,362 B2   3/2010 Rasras
9,122,006 B1   9/2015 Roth et al.
9,523,820 B1  12/2016 Vermeulen
(Continued)

FOREIGN PATENT DOCUMENTS

WO    2016071345 A1    5/2016

OTHER PUBLICATIONS

Tu, Xin, et al., "Compact PSR Based on an Asymmetric Bi-level Lateral Taper in an Adiabatic Directional Coupler," Journal of Lightwave Technology, 2016, vol. 34, No. 3, 985-991.
(Continued)

*Primary Examiner* — Jerry Blevins
(74) *Attorney, Agent, or Firm* — Mendelsohn Dunleavy, P.C.; Yuri Gruzdkov

(57) ABSTRACT

A photonic integrated circuit (PIC) having two tapered planar waveguide cores that are separated from one another by a relatively narrow gap, with each of these waveguide cores having a respective portion thereof located on a tapered planar slab core. The relative positions of the slab core and the two waveguide cores are such that the light crossing between the two waveguide cores undergoes a polarization rotation between the TM and TE polarizations with a relatively low insertion loss. The corresponding waveguide structure can be used as a relative polarization-rotating splitter for light propagating in one direction or as a relative polarization-rotating combiner for light propagating in the opposite direction. At least some embodiments of the disclosed PIC can advantageously be fabricated using a complementary metal oxide semiconductor technology and/or a conventional silicon-on-insulator platform.

20 Claims, 4 Drawing Sheets

(56) References Cited

U.S. PATENT DOCUMENTS 9,523,920 B2     12/2016   Vermeulen
2015/0338577 A1*   11/2015   Shi ........................ G02B 6/126
                                                                                                        385/11

OTHER PUBLICATIONS

Wang, Yun, et al., "Ultra-Compact Sub-Wavelength Grating Polarization Splitter-Rotator for Silicon-on-Insulator Platform," IEEE Photonics Journal, 2016, vol. 8, No. 6 (10 pages).

Dai, Daoxin et al., "Passive technologies for future large-scale photonic integrated circuits on silicon: polarization handling, light non-reciprocity and loss reduction," Light: Science & Applications (2012) vol. 1, e1; doi:10.1038/lsa.2012.1 (12 pages).

Fukuda, Hiroshi, et al., "Polarization rotator based on silicon wire waveguides," Optics Express, 2008, vol. 16, No. 4, pp. 2628-2635.

Daoxin Dai and John E. Bowers, "Novel concept for ultracompact polarization splitter-rotator based on silicon nanowires," Opt. Express 19, (2011), pp. 10940-10949.

Liu Liu, Yunhong Ding, Kresten Yvind, and Jørn M. Hvam, "Efficient and compact TE-TM polarization converter built on silicon-on-insulator platform with a simple fabrication process", Optics Letters, vol. 36, Issue 7, (2011) pp. 1059-1061.

Zhang, M. Yu, G. Lo and D. Kwong, "Silicon-Waveguide-Based Mode Evolution Polarization Rotator," in IEEE Journal of Selected Topics in Quantum Electronics, vol. 16, No. 1, Jan.-Feb. 2010, pp. 53-60.

\* cited by examiner

100

120

DD

CC

BB

120

PHOTONIC INTEGRATED CIRCUIT HAVING A RELATIVE POLARIZATION-ROTATING SPLITTER/COMBINER

BACKGROUND

Field

The present disclosure relates to optical equipment and, more specifically but not exclusively, to a photonic integrated circuit (PIC) having a relative polarization-rotating splitter or combiner.

Description of the Related Art

This section introduces aspects that may help facilitate a better understanding of the disclosure. Accordingly, the statements of this section are to be read in this light and are not to be understood as admissions about what is in the prior art or what is not in the prior art.

Polarization beam splitters and combiners are used, e.g., in optical transmitters and receivers configured to handle polarization-division-multiplexed (PDM) communication signals. In its conventional form, an optical polarization beam splitter (PBS) can be a prism made of two triangular pieces of a birefringent crystalline material (such as calcite) that are glued together in an orthogonal orientation of their crystal axes. At the internal interface of the prism, an unpolarized beam of light splits into two linearly polarized beams having mutually orthogonal polarizations that leave the prism at a divergence angle. Such a prism can alternatively be used as a polarization beam combiner (PBC), e.g., for light propagating in the direction opposite to that used in the PBS configuration of the same prism.

SUMMARY OF SOME SPECIFIC EMBODIMENTS

Disclosed herein are various embodiments of a PIC having two tapered planar waveguide cores that are separated from one another by a relatively narrow gap, with each of these waveguide cores having a respective portion thereof located on a tapered planar slab core. The relative positions of the slab core and the two waveguide cores are such that the light crossing between the two waveguide cores by way of adiabatic mode conversion undergoes a polarization rotation between the TM and TE polarizations. The corresponding waveguide structure can be used as a relative polarization-rotating splitter for light propagating in one direction or as a relative polarization-rotating combiner for light propagating in the opposite direction. At least some embodiments of the disclosed PIC can advantageously be fabricated using a conventional complementary metal oxide semiconductor technology and/or a conventional silicon-on-insulator platform.

According to one embodiment, provided is an apparatus comprising: a first waveguide core disposed on a planar substrate; a second waveguide core disposed on the planar substrate and separated by a gap from the first waveguide core; and a slab core disposed on the planar substrate and having a first end and a second end, the first end being narrower than the second end. The slab core comprises a first portion located within the gap, the first portion being attached to the first waveguide core and being separated by the gap from the second waveguide core. The slab core further comprises a second portion located within the gap, the second portion being attached to the first waveguide core and to the second waveguide core to bridge the gap.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Optical devices that are made using the planar lightwave circuit (PLC) technology inherit many advantages of electronic integrated circuits (ICs), such as small size, high reliability, and amenability to mass production. Such optical devices also beneficially lend themselves to relatively straightforward integration with microelectronics. Among the different sets of materials that can be used in the fabrication of the corresponding photonic integrated circuits (PICs), the silicon-nanowire platform has received one of the greater shares of research and development activity. At least partially, this is due to the fact that "silicon" is a fundamental platform for the entire IC technology. As a result, silicon-nanowire PICs can greatly benefit from the huge prior investment into the complementary metal oxide semiconductor (CMOS) technology and the silicon-on-insulator (SOI) platform.

One of the problems with silicon/silicon oxide waveguides of CMOS/SOI PICs is that they have a relatively large difference between the refractive indices of the core and cladding, due to which such waveguides are often referred to as the "high refractive-index-contrast waveguides." For these waveguides, the transverse electric (TE) and transverse magnetic (TM) polarization components can have a relatively large difference in their group indices. For example, TE and TM polarization modes in silicon have group indices of about 4.1 and 2.8, respectively. This relatively large group-index difference makes it relatively difficult to construct a polarization-diverse PIC having a substantially polarization-independent response.

One possible approach to solving this problem is to split an optical PDM signal into a TE component and a TM component and then rotate the polarization of the TM component, thereby converting the latter into a corresponding TE-polarized signal that can be handled by the PIC in the same manner as the other TE component. An optical circuit that can perform this transformation can be referred to as a relative polarization-rotating splitter. When configured to process light propagating in the opposite direction, the same optical circuit can typically operate as a relative polarization-rotating combiner. Unfortunately, a conventional PBS or PBC, due to its bulk, is not suitable for integration into a PIC and, as such, cannot be used to implement this approach.

At least some of the above-indicated problems in the state of the art can be addressed using various embodiments of a relative polarization-rotating splitter/combiner disclosed herein. Some embodiments can advantageously be designed and configured to work in a part of or all of the wavelength range between ca. 1.4 μm and 1.7 μm with a signal-conversion efficiency greater than about 90%. Particularly beneficial can be the concomitant ability to make the corresponding PICs using standard CMOS fabrication processes that are already in use in silicon foundries.

Figure 1:
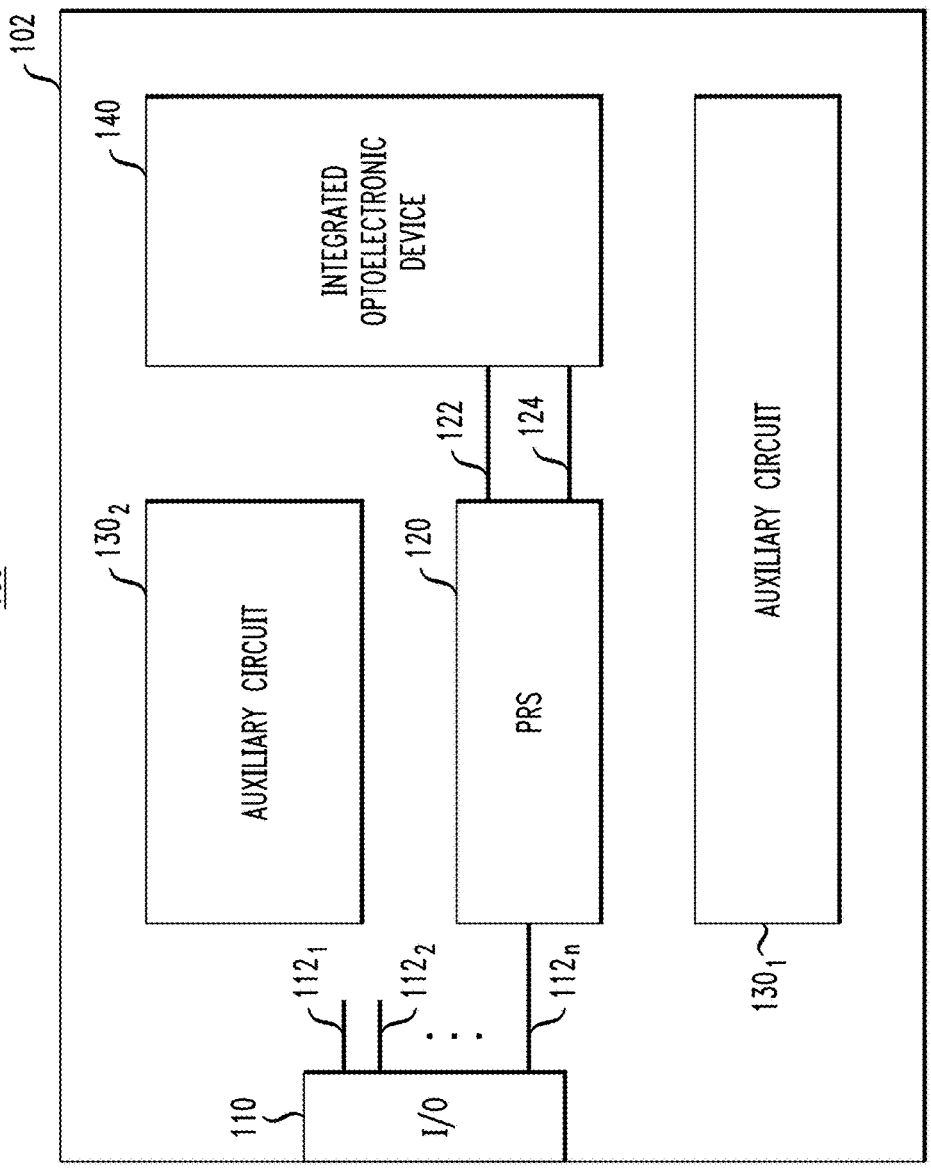
FIG. 1 shows a schematic top view of a PIC according to an embodiment.

FIG. 1 shows a schematic top view of a PIC 100 according to an embodiment. PIC 100 comprises a substantially planar substrate 102 on which other components of the PIC are supported. As used herein, the term "substantially planar" refers to the fact that the variation of the feature height and/or thickness across substrate 102 is significantly smaller than the lateral size(s) of the substrate. The height and/or thickness are measured along the Y-coordinate axis of the XYZ coordinate system shown in FIG. 1. The lateral dimensions are measured in the XZ plane of that coordinate system.

PIC 100 further comprises an optical input/output (I/O) coupler 110 through which light can be coupled in and out of the PIC's planar waveguides $112_1$-$112_n$, e.g., as known in the pertinent art. Waveguide $112_n$ connects I/O coupler 110 to a relative polarization-rotating splitter (PRS) 120 that is further optically connected, by way of planar waveguides 122 and 124, to an integrated optoelectronic device 140 disposed on substrate 102. Various embodiments of PRS 120 are described in more detail below in reference to FIGS. 2-4.

In an example embodiment, device 140 may include one or more of the following: (i) a laser; (ii) an optical modulator; (iii) a tunable phase shifter; (iv) a tunable optical filter; and (v) a photodetector. The operation of device 140 may be enabled and supported by one or more auxiliary electrical circuits 130, two of which (labeled $130_1$ and $130_2$) are shown in FIG. 1 for illustration purposes. In some embodiments, circuits $130_1$ and $130_2$ can be used to: (i) generate and supply to device 140 one or more currents and/or voltages for appropriately driving the optoelectronic components thereof and/or (ii) receive and process electrical signals generated by device 140, e.g., in response to light received through waveguides 122 and 124. Depending on the particular type of device 140, PIC 100 can be used to implement, e.g., an optical transmitter or an optical receiver.

In various embodiments of PIC 100, PRS 120 can be configured to operate as an optical splitter or as an optical combiner that also relatively polarization rotates two components of light.

In the splitter configuration, PRS 120 operates to receive light through waveguide $112_n$ and output light through waveguides 122 and 124. I/O coupler 110 can be used, e.g., to couple light into waveguide $112_n$ from an external optical fiber (not explicitly shown in FIG. 1). The X and Y polarizations of light from such fiber typically couple, e.g., primarily or largely into the TE and TM modes, respectively, of waveguide $112_n$. In operation, PRS 120 causes the light of the TE mode of waveguide $112_n$ to be transferred to waveguide 124. PRS 120 further causes the polarization of the light of the TM mode of waveguide $112_n$ to be rotated and transferred to waveguide 122 as a corresponding TE-polarized optical signal, i.e., producing a relative polarization rotation between the two input modes. As a result, device 140 can advantageously be designed and configured to process only TE-polarized light, thereby circumventing some or all of the above-indicated problems associated with high refractive-index-contrast waveguides.

In the combiner configuration, PRS 120 operates to receive light through waveguides 122 and 124 and output light through waveguide $112_n$. In the corresponding embodiment of PIC 100, device 140 can advantageously be designed and configured to apply substantially only TE-polarized light to waveguides 122 and 124. In operation, PRS 120 causes the light of the TE mode of waveguide 124 to be coupled into the corresponding TE mode of waveguide $112_n$. PRS 120 further causes the polarization of the light of the TE mode of waveguide 122 to be rotated and coupled into the corresponding TM mode of waveguide $112_n$, i.e., causing a relative polarization rotation in the combination of input light beams thereby produced. I/O coupler 110 can then be used, e.g., to couple the light from the TE and TM modes of waveguide $112_n$, e.g. primarily or largely into the X and Y polarizations, respectively, of light in an external optical fiber (not explicitly shown in FIG. 1).

Figure 2A:
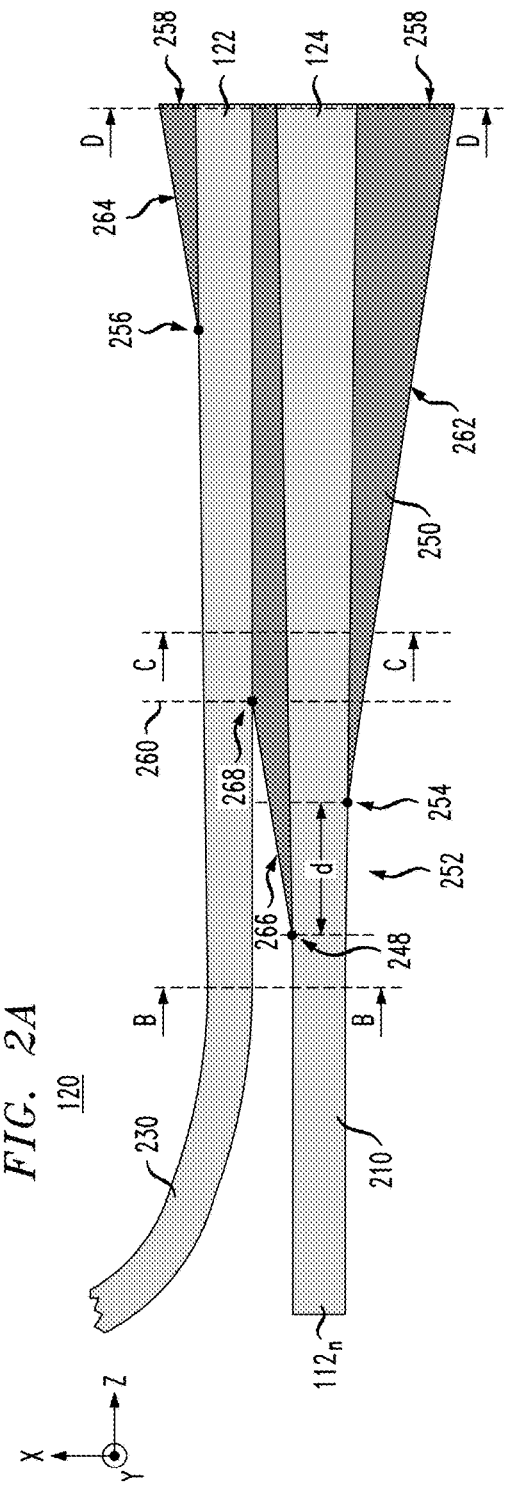
FIGS. 2A-2D show schematic views of a relative polarization-rotating splitter that can be used in the PIC of FIG. 1 according to an embodiment.
Figure 2D:
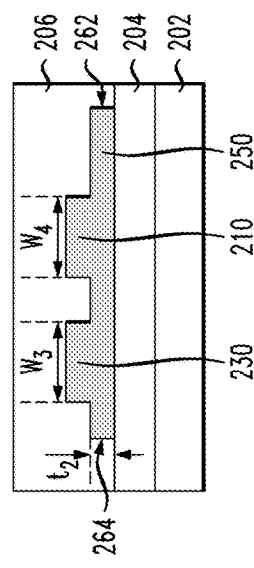
Figure 2C:
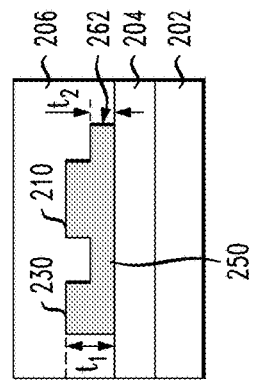
Figure 2B:
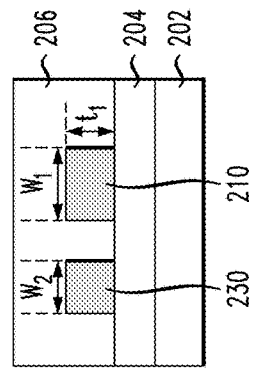

FIGS. 2A-2D show schematic views of PRS 120 according to an embodiment. More specifically, FIG. 2A shows a schematic top view of PRS 120. FIGS. 2B-2D show schematic cross-sectional side views of PRS 120 along the three cross-section planes indicated in FIG. 2A.

In the shown embodiment, PRS 120 comprises waveguide cores 210 and 230 and a laterally tapered slab core 250. PRS 120 further comprises an undercladding 204 and an overcladding 206 that encapsulate waveguide cores 210 and 230 and laterally tapered slab core 250, e.g., as indicated in FIGS. 2B-2D, to form the corresponding waveguides. A bottom layer 202 provides structural support for the shown elements of PRS 120 and can be a part of substrate 102 (see FIG. 1).

Waveguide core 210 directly end-connects waveguides $112_n$ and 124 as indicated in FIG. 2A (also see FIG. 1). To the left (as viewed in FIG. 2A) of the plane BB, waveguide core 210 has a constant width $w_1$ and a constant thickness $t_1$ (see FIG. 2B). Between the planes BB and DD, the width of waveguide core 210 gradually (e.g., linearly and/or adiabatically) changes from $w_1$ to $w_4$ (see FIGS. 2B and 2D). In some embodiments, $w_1$ can be smaller than $w_4$. In some other embodiments, $w_1$ can be greater than $w_4$. The manner in which the width of waveguide core 210 changes as a function of the coordinate Z is not limited to a linear function and can be arranged to change in accordance with any suitable function of the coordinate Z.

Waveguide core 230 is directly end-connected to waveguide 122 as indicated in FIG. 2A. To the left (as viewed in FIG. 2A) of the plane BB, waveguide core 230 has a constant width $w_2$ and the same constant thickness $t_1$ as waveguide core 210 (see FIG. 2B). The separation between waveguide cores 210 and 230 gradually changes in that portion of PRS 120, e.g., as indicated in FIG. 2A, due to the curved shape of waveguide core 230. Between the planes BB and DD, the width of waveguide core 230 gradually changes from $w_2$ to $w_3$ (see FIGS. 2B and 2D). In some embodiments, $w_2$ can be smaller than $w_3$. In some other embodiments, $w_2$ can be greater than $w_3$. The manner in which the width of waveguide core 230 changes as a function of the coordinate Z is not limited to a linear function and can be arranged to change in accordance with any suitable function of the coordinate Z.

In various embodiments, the separation (gap width) between waveguide cores 210 and 230 can be constant or change as a function of the coordinate Z between the planes BB and DD.

Laterally tapered slab core 250 has a narrow end 252 located at waveguide core 210 near the plane BB, e.g., as indicated in FIG. 2A. A wide end (edge) 258 of laterally tapered slab core 250 is located near the plane DD and is wider than the combined width of waveguide cores 210 and 230 and the gap between them, e.g., as indicated in FIGS. 2A and 2D. To the left (as viewed in FIG. 2A) of a plane 260, laterally tapered slab core 250 does not fully bridge the gap between waveguide cores 210 and 230, and only partially extends into that gap from waveguide core 210 (e.g., as can be seen in the left panel of FIG. 4F). To the right (as viewed in FIG. 2A) of the plane 260, laterally tapered slab core 250 fully bridges the gap between waveguide cores 210 and 230, e.g., as shown in FIGS. 2C and 2D. In an example embodiment, laterally tapered slab core 250 has a constant thickness $t_2$ that is smaller than $t_1$ (see FIGS. 2C and 2D).

Laterally tapered slab core 250 has planar sidewalls 262, 264, and 266 that are substantially orthogonal (e.g., to within ±15 degrees) to bottom layer 202 and/or planar substrate 102. Sidewall 262 is connected to a sidewall of waveguide core 210 at an edge point 254. Sidewall 264 is connected to a sidewall of waveguide core 230 at an edge point 256. Sidewall 266 is connected to another sidewall of waveguide core 210 at an edge point 248 and to another sidewall of waveguide core 230 at an edge point 268. In an example embodiment, planar sidewalls 264 and 266 are coplanar (e.g., lie in the same plane).

Note that, to the left (as viewed in FIG. 2A) of the plane BB, a cross-section of waveguide cores 210 and 230 has a horizontal plane of symmetry that is parallel to the XZ coordinate plane. This property of waveguide cores 210 and 230 can be seen, e.g., in FIG. 2B. To the right (as viewed in FIG. 2A) of the plane BB, the presence of laterally tapered slab core 250 breaks this symmetry, e.g., as can be seen in FIGS. 2C and 2D. This particular characteristic of waveguide cores 210 and 230 and laterally tapered slab core 250 enables PRS 120 to perform the relative polarization rotation that is described in more detail below.

In some embodiments, laterally tapered slab core 250 is arranged such that edge point 248 and edge point 254, which are located on opposite sidewalls of waveguide core 210, are separated by a non-zero distance d, with the distance d being measured along the longitudinal axis of waveguide core 210, as indicated in FIG. 2A. The edge point 248 is located where laterally tapered slab core 250 begins to extend from a sidewall of waveguide core 210 into the gap between waveguide cores 210 and 230. The edge point 254 is located where laterally tapered slab core 250 begins to extend out from waveguide core 210 at the sidewall thereof facing away from waveguide cores 210 and 230. In various embodiments, either the edge point 248 or the edge point 254 can be closer to the plane BB.

In some other embodiments, laterally tapered slab core 250 can be oriented such that the distance d is zero.

In some embodiments, the manner in which the width of laterally tapered slab core 250 changes as a function of the coordinate Z is not limited to a linear function and can be arranged to change in accordance with any suitable nonlinear function of the coordinate Z, e.g., a piece-wise smooth function of Z such as a curved convex-up or concave-up function of Z.

In an example embodiment, the values of $w_1$-$w_4$, $t_1$, and $t_2$, the lengths of the tapered sections of waveguide cores 210 and 230, the length of laterally tapered slab core 250, and the separation (gap width) between waveguide cores 210 and 230 can be selected such that the mode conversion occurs as follows. The $TE_0$ mode of waveguide $112_n$ is coupled with a relatively low insertion loss (e.g., with at least ~90% efficiency) to the $TE_0$ mode of waveguide 124. The $TM_0$ mode of waveguide $112_n$ is coupled with a relatively low insertion loss (e.g., with at least ~90% efficiency) to the $TE_0$ mode of waveguide 122. Such mode coupling can be achieved for light propagating in either direction. Numerical simulations confirm the above-indicated low insertion losses.

Between the planes BB and DD, waveguide cores 210 and 230 and laterally tapered slab core 250 taken together form a supercore structure whose eigenmodes gradually change (evolve) as a function of Z. In a typical embodiment, the $TE_0$ mode of waveguide $112_n$ and the $TE_0$ mode of waveguide 124 approximately match the first (fundamental) eigenmode of the supercore structure at the planes BB and DD, respectively. The $TM_0$ mode of waveguide $112_n$ and the $TE_0$ mode of waveguide 122 approximately match the second eigenmode of the supercore structure at the planes BB and DD, respectively. Between the planes BB and DD, the cross-sectional shape of the supercore structure changes adiabatically such that the relative order of the eigenmodes, in terms of their respective effective refractive indices, remains unchanged. The latter property enables the supercore structure to efficiently transfer light (i) between the $TE_0$ mode of waveguide $112_n$ and the $TE_0$ mode of waveguide 124 and (ii) between the $TM_0$ mode of waveguide $112_n$ and the $TE_0$ mode of waveguide 122 accompanied by the concomitant polarization rotation.

In some embodiments, the $TM_0$ mode of waveguide $112_n$ and the $TE_0$ mode of waveguide 122 can approximately match the second eigenmode of the supercore structure at the planes BB and DD, respectively. In this case, efficient light transfer between the $TM_0$ mode of waveguide $112_n$ and the $TE_0$ mode of waveguide 122, accompanied by the concomitant polarization rotation, can also be realized.

Figure 3:
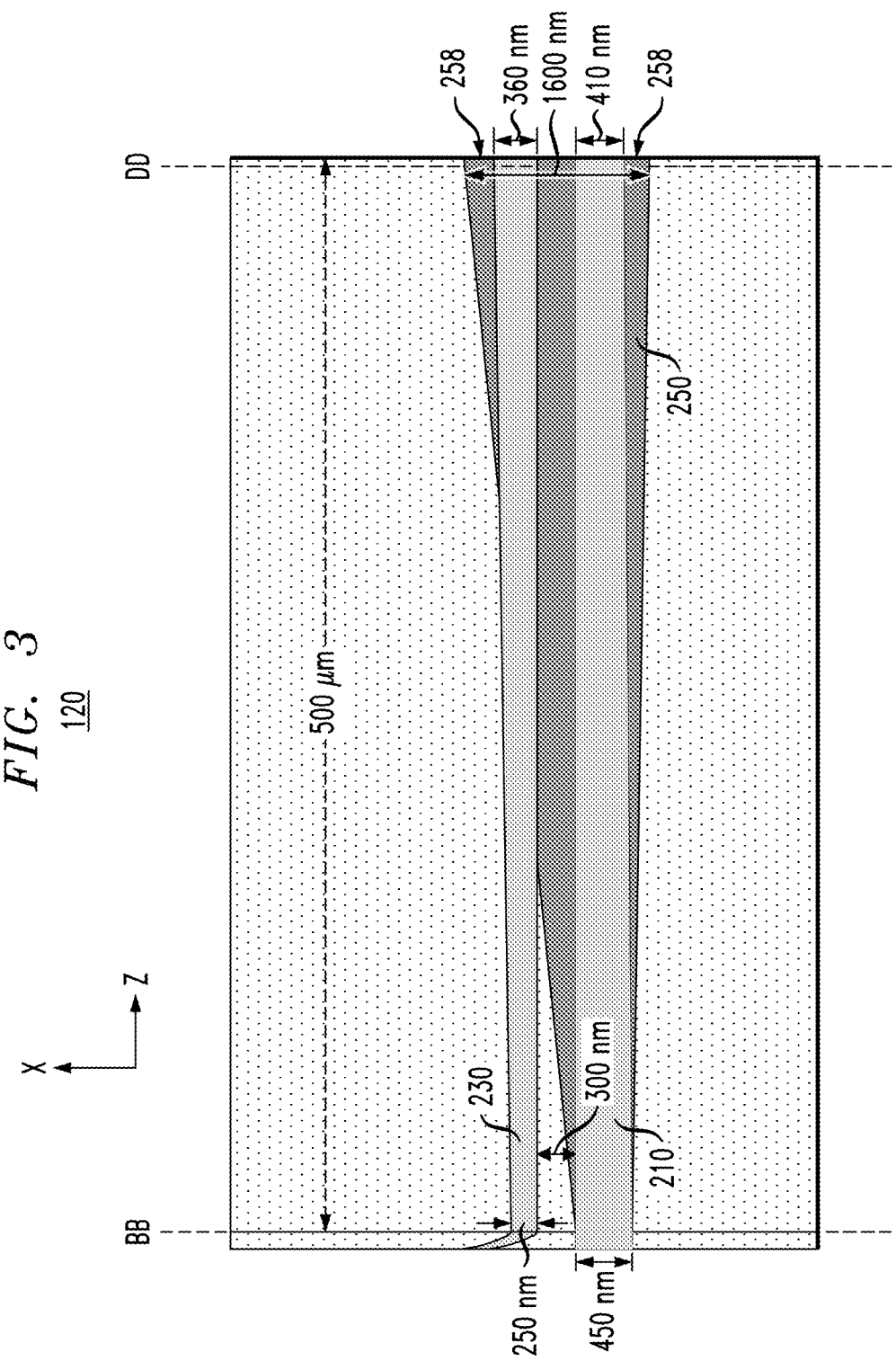
FIG. 3 shows example dimensions of some structural features of the relative polarization-rotating splitter shown in FIGS. 2A-2D according to an embodiment.

FIG. 3 shows example dimensions of some structural features of PRS 120 according to an embodiment. In this particular embodiment, waveguide cores 210 and 230 and laterally tapered slab core 250 are made of silicon having the refractive index of approximately 3.5. Undercladding 204 and overcladding 206 are both made of silicon oxide having the refractive index of approximately 1.45. Waveguide cores 210 and 230 have the following sizes: $w_1$=450 nm; $w_2$=250 nm; $w_3$=360 nm; $w_4$=410 nm; and $t_1$=220 nm (also see FIGS. 2B-2D). The separation between waveguide cores 210 and 230 is 300 nm. Laterally tapered slab core 250 has the following sizes: $t_2$=90 nm; the width of edge 258 is 1600 nm; and the length along the Z-coordinate axis is 500 μm (also see FIGS. 2C-2D).

In some embodiments, undercladding 204 and overcladding 206 can be made of different respective dielectric materials.

FIGS. 4A-4F schematically show a fabrication process that can be used to make PRS 120 according to an embodiment. The right panel in each of FIGS. 4A-4F shows a top view of a corresponding structure. The left panel in each of FIGS. 4A-4F shows a cross-sectional side view of the corresponding structure along a cross-sectional plane 410 indicated in the right panel.

Figure 4A:
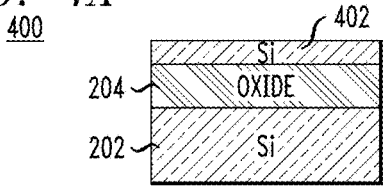
FIGS. 4A-4F schematically show a fabrication process that can be used to make the relative polarization-rotating splitter shown in FIGS. 2A-2D according to an embodiment.
Figure 4A:
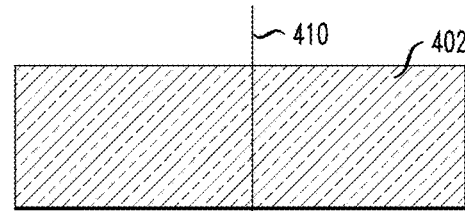

Referring to FIG. 4A, the fabrication process begins with a SOI wafer 400 that includes a silicon base layer 202, a silicon oxide layer 204, and a silicon top layer 402. The thickness of silicon top layer 402 is $t_1$.

Figure 4B:
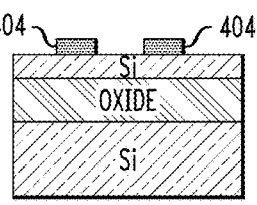
Figure 4B:
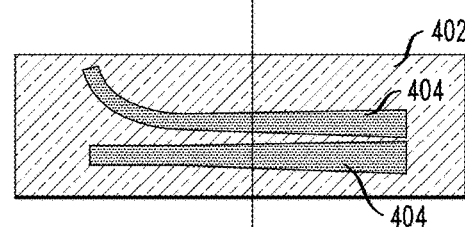

Referring to FIG. 4B, an etch mask 404 is deposited over top layer 402. The geometric layout of etch mask 404 corresponds to the desired shape of waveguide cores 210 and 230 (also see FIG. 2A).

Figure 4C:
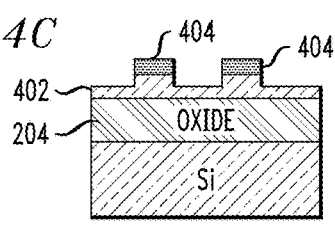
Figure 4C:
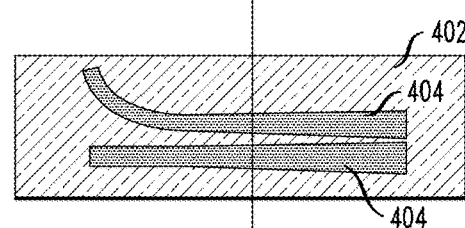

Referring to FIG. 4C, the structure of FIG. 4B is subjected to reactive etching to reduce, down to $t_2$, the thickness of the unprotected portion of top layer 402. This reactive etching defines the top ridges of the nascent waveguide cores 210 and 230.

Figure 4D:
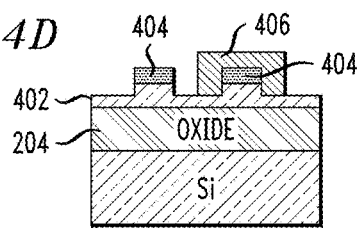
Figure 4D:
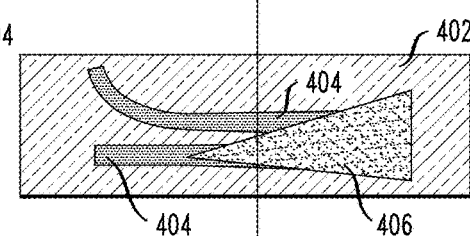

Referring to FIG. 4D, a photoresist mask 406 is deposited over the structure of FIG. 4C. The geometric layout of photoresist mask 406 corresponds to the desired shape of laterally tapered slab core 250 (also see FIG. 2A).

Figure 4E:
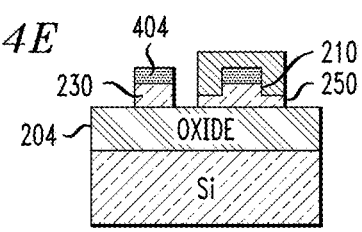
Figure 4E:
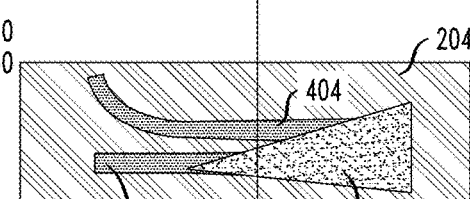

Referring to FIG. 4E, the structure of FIG. 4D is subjected to further reactive etching to remove the unprotected portions of top layer 402 and expose the underlying portions of silicon oxide layer 204. This reactive etching forms the supercore structure comprising waveguide cores 210 and 230 and laterally tapered slab core 250.

Figure 4F:
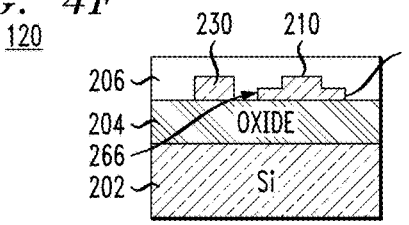
Figure 4F:
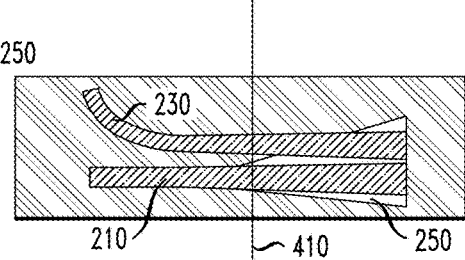

Referring to FIG. 4F, the structure of FIG. 4E is subjected to further etching and washing to remove therefrom photoresist mask 406 and etch mask 404. Cladding layer 206 is then deposited over the resulting structure to encapsulate waveguide cores 210 and 230 and laterally tapered slab core 250 to arrive at the PRS structure shown in FIGS. 2A-2D.

A person of ordinary skill in the art will appreciate that the fabrication method illustrated by FIGS. 4A-4F may use various fabrication techniques that may include, but are not necessarily limited to: (1) CMOS fabrication techniques; (2) wafer/material processing techniques employing, e.g., lithography, chemical vapor deposition, patterning and selective etching of materials, and treating, shaping, plating, and texturing of surfaces; and (3) self-assembly techniques employing, e.g., self-assembling monolayers, chemical coatings having high affinity to a desired chemical substance, and production and saturation of dangling chemical bonds.

According to an example embodiment disclosed above in reference to FIGS. 1-4, provided is an apparatus (e.g., 100, FIG. 1) comprising: a first waveguide core (e.g., 210, FIG. 2) disposed on a planar substrate (e.g., 102, FIG. 1; 202, FIG. 2); a second waveguide core (e.g., 230, FIG. 2) disposed on the planar substrate and separated by a gap from the first waveguide core; and a slab core (e.g., 250, FIG. 2) disposed on the planar substrate and having a first end (e.g., 252, FIG. 2) and a second end (e.g., 258, FIG. 2), the first end being narrower than the second end; and wherein the slab core comprises a first portion (e.g., between 248 and 254, FIG. 2) located within the gap, the first portion being attached to the first waveguide core and being separated by the gap from the second waveguide core; and wherein the slab core further comprises a second portion (e.g., between 260 and CC, FIG. 2) located within the gap, the second portion being attached to the first waveguide core and to the second waveguide core to bridge the gap.

In some embodiments of the above apparatus, the slab core further comprises a third portion (e.g., between 254 and DD, FIG. 2) located outside the gap, the third portion being attached to the first waveguide core.

In some embodiments of any of the above apparatus, the slab core further comprises a fourth portion (e.g., between 256 and DD, FIG. 2) located outside the gap, the fourth portion being attached to the second waveguide core.

In some embodiments of any of the above apparatus, a segment (e.g., near BB, FIG. 2A) of the first waveguide core not in direct contact with the slab core has a transverse electric mode and a transverse magnetic mode as fundamental and first excited modes therein.

In some embodiments of any of the above apparatus, a core segment (e.g., near DD, FIG. 2A) of the first and second waveguide cores in direct contact with a segment of the slab core has two transverse electric modes as fundamental and first excited modes in said core segment.

In some embodiments of any of the above apparatus, in the core segment, one of the two transverse electric modes is primarily guided along the first waveguide core and the other of the two transverse electric modes is primarily guide along the second waveguide core.

In some embodiments of any of the above apparatus, the slab core has a first planar sidewall (e.g., 262, FIG. 2) connected (e.g., at 254, FIG. 2A) to a sidewall of the first waveguide core, the first planar sidewall being substantially orthogonal (e.g., to within ±15 degrees) to the planar substrate.

In some embodiments of any of the above apparatus, the slab core has a second planar sidewall (e.g., 264 or 266, FIG. 2) connected (e.g., at 256 or 268, FIG. 2) to a sidewall of the second waveguide core, the second planar sidewall being substantially orthogonal to the planar substrate.

In some embodiments of any of the above apparatus, the second planar sidewall (e.g., 266, FIG. 2) is further connected (e.g., at 248, FIG. 2) to a sidewall of the first waveguide core.

In some embodiments of any of the above apparatus, the slab core has a third planar sidewall (e.g., 264, FIG. 2) connected (e.g., at 256, FIG. 2) to another sidewall of the second waveguide core, the third planar sidewall being substantially orthogonal to the planar substrate and coplanar with the second planar sidewall (e.g., 266, FIG. 2A).

In some embodiments of any of the above apparatus, the apparatus further comprises a cladding (e.g., 204/206, FIGS. 2B-2D, 4F) that fills the gap and encapsulates the first waveguide core, the second waveguide core, and the slab core.

In some embodiments of any of the above apparatus, each of the first waveguide core, the second waveguide core, and the slab core comprises silicon; and the cladding comprises silicon oxide.

In some embodiments of any of the above apparatus, the apparatus further comprises first, second, and third optical ports (e.g., 112$_n$, 122, 124, FIG. 1); wherein the first waveguide core is connected between the first optical port and the third optical port; and wherein the second waveguide core is connected to the second optical port.

In some embodiments of any of the above apparatus, the first waveguide core, the second waveguide core, and the slab core are configured to cause a polarization rotation for light propagating between the first optical port and the second optical port, the polarization rotation being between a TM polarization at the first optical port and a TE polarization at the second optical port.

In some embodiments of any of the above apparatus, the first waveguide core, the second waveguide core, and the slab core are further configured to cause an optical beam applied to the first optical port to be split into a first sub-beam and a second sub-beam, the first sub-beam being directed to the third optical port, and the second sub-beam being directed to the second optical port.

In some embodiments of any of the above apparatus, the first waveguide core, the second waveguide core, and the slab core are further configured to cause optical beams applied to the second and third optical ports to be combined and directed to the first optical port.

In some embodiments of any of the above apparatus, the first waveguide core has a first width (e.g., $w_1$, FIG. 2B) at the first optical port and a different second width (e.g., $w_4$, FIG. 2D) at the third optical port.

In some embodiments of any of the above apparatus, the different second width is smaller than the first width (e.g., as indicated in FIG. 3).

In some embodiments of any of the above apparatus, the first optical port is located at the first end of the slab core; and the second and third optical ports are located at the second end of the slab core.

In some embodiments of any of the above apparatus, each of the first waveguide core and the second waveguide core has a first thickness (e.g., $t_1$, FIG. 2C); and the slab core has a second thickness (e.g., $t_2$, FIG. 2C) smaller than the first thickness.

In some embodiments of any of the above apparatus, the second waveguide core comprises a tapered portion (e.g., located between BB and DD, FIGS. 2A and 3).

In some embodiments of any of the above apparatus, the apparatus further comprises an optoelectronic device (e.g., 140, FIG. 1) disposed on the planar substrate and configured to receive or output light by way of the first waveguide core and the second waveguide core.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three-dimensional structure as shown in the figures. Such "height" would be vertical where the corresponding layers are horizontal but would be horizontal where the corresponding layers are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

What is claimed is:

1. An apparatus comprising a waveguide structure disposed on a planar substrate;
   wherein the waveguide structure comprises:
      a first waveguide core disposed on the planar substrate;
      a second waveguide core disposed on the planar substrate and separated by a gap from the first waveguide core; and
      a slab core disposed on the planar substrate and having a first end and a second end, the first end being narrower than the second end;
   wherein, within a first planar cross-section, the waveguide structure has a portion of the first waveguide core and a portion of the second waveguide core, said portions of the first and second waveguide cores not being directly attached to the slab core, the first planar cross-section being orthogonal to the planar substrate;
   wherein, within a second planar cross-section, the slab core comprises a first portion located within the gap, the first portion being directly attached to the first waveguide core and being separated by the gap from the second waveguide core, the second planar cross-section being parallel to the first planar cross-section; and
   wherein, within a third planar cross-section, the slab core comprises a second portion located within the gap, the second portion being directly attached to the first waveguide core and to the second waveguide core to bridge the gap, the third planar cross-section being parallel to the first planar cross-section.

2. The apparatus of claim 1,
   wherein a segment of the first waveguide core not in direct contact with the slab core has a transverse electric mode and a transverse magnetic mode as fundamental and first excited modes therein; and
   wherein a core segment of the first and second waveguide cores in direct contact with a segment of the slab core has two transverse electric modes as fundamental and first excited modes in said core segment.

3. The apparatus of claim 2, wherein, in the core segment, one of the two transverse electric modes is primarily guided along the first waveguide core and the other of the two transverse electric modes is primarily guide along the second waveguide core.

4. The apparatus of claim 1, wherein the slab core further comprises a third portion located outside the gap, the third portion being directly attached to the second waveguide core.

5. The apparatus of claim 1, wherein the slab core has a first planar sidewall connected to a sidewall of the first waveguide core, the first planar sidewall being substantially orthogonal to the planar substrate.

6. The apparatus of claim 5, wherein the slab core has a second planar sidewall connected to a sidewall of the second waveguide core, the second planar sidewall being substantially orthogonal to the planar substrate.

7. The apparatus of claim 6,
wherein the second planar sidewall is further connected to a sidewall of the first waveguide core; and
wherein the slab core has a third planar sidewall connected to another sidewall of the second waveguide core, the third planar sidewall being substantially orthogonal to the planar substrate and coplanar with the second planar sidewall.

8. The apparatus of claim 1, further comprising a cladding that fills the gap and encapsulates the first waveguide core, the second waveguide core, and the slab core.

9. The apparatus of claim 1, wherein the slab core further comprises a third portion located outside the gap, the third portion being directly attached to the first waveguide core.

10. The apparatus of claim 9, wherein the slab core further comprises a fourth portion located outside the gap, the fourth portion being directly attached to the second waveguide core.

11. The apparatus of claim 1, further comprising first, second, and third optical ports;
wherein the first waveguide core is connected between the first optical port and the third optical port; and
wherein the second waveguide core is connected to the second optical port.

12. The apparatus of claim 11, wherein the first waveguide core, the second waveguide core, and the slab core are configured to cause a polarization rotation for light propagating between the first optical port and the second optical port, the polarization rotation being between a TM polarization at the first optical port and a TE polarization at the second optical port.

13. The apparatus of claim 12, wherein the first waveguide core, the second waveguide core, and the slab core are further configured to cause an optical beam applied to the first optical port to be split into a first sub-beam and a second sub-beam, the first sub-beam being directed to the third optical port, and the second sub-beam being directed to the second optical port.

14. The apparatus of claim 12, wherein the first waveguide core, the second waveguide core, and the slab core are further configured to cause optical beams applied to the second and third optical ports to be combined and directed to the first optical port.

15. The apparatus of claim 11, wherein the first waveguide core has a first width at the first optical port and a different second width at the third optical port.

16. The apparatus of claim 15, wherein the different second width is smaller than the first width.

17. The apparatus of claim 11,
wherein the first optical port is located at the first end of the slab core; and
wherein the second and third optical ports are located at the second end of the slab core.

18. The apparatus of claim 1,
wherein each of the first waveguide core and the second waveguide core has a first thickness; and
wherein the slab core has a second thickness smaller than the first thickness.

19. The apparatus of claim 1, wherein the second waveguide core comprises a tapered portion.

20. The apparatus of claim 1, further comprising an optoelectronic device disposed on the planar substrate and configured to receive or output light by way of the first waveguide core and the second waveguide core.

* * * * *